Figure 1:
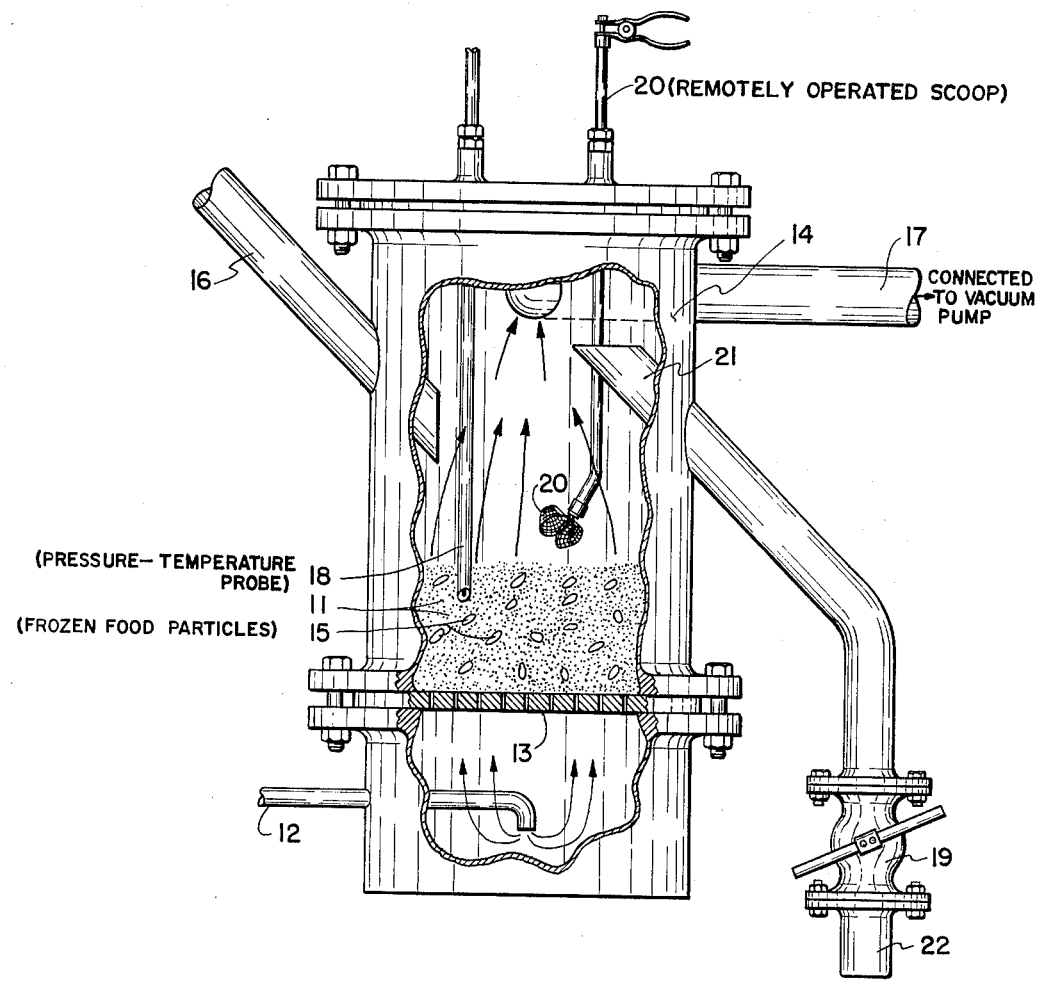

March 15, 1966 W. H. MINK ETAL 3,239,942
PROCESS FOR DRYING FOOD
Filed April 16, 1962 2 Sheets-Sheet 1

INVENTORS
WILLIAM H. MINK
HERMAN NACK

United States Patent Office 3,239,942
Patented Mar. 15, 1966

3,239,942
PROCESS FOR DRYING FOOD
William H. Mink and Herman Nack, Columbus, Ohio, assignors, by mesne assignments, to The Battelle Development Corporation, Columbus, Ohio, a corporation of Delaware
Filed Apr. 16, 1962, Ser. No. 187,949
10 Claims. (Cl. 34—9)

This invention relates to a process for drying food by immersing it in a frozen condition in a fluidized bed of solid discrete particles at subatmospheric pressure. More specifically, this process relates to the sublimation of ice in a food by immersing the food in a fluidized bed of solid, discrete particles at an appropriate temperature and pressure.

The method of drying foodstuffs by sublimation of ice is commonly known as "freeze-drying." In freeze-drying, the food to be treated is frozen and, while frozen, is subjected to low pressure conditions so that the water present in the foodstuff as ice is removed by sublimation. Properly packaged, freeze-dried foods can be stored for long periods of time without refrigeration. Prior to use, water is added to the freeze-dried food to replace that which had been removed in processing. In this state, the food is referred to as a "reconstituted" food. The degree to which the reconstituted food approaches the appearance and taste of the original depends on the way in which the drying is conducted. Substantial research has been conducted to develop methods that will yield products that are indistinguishable in appearance and taste from the original food. Methods are now reported for freeze-drying that yield reconstituted food items of reasonable quality. One such process is described in U.S. Patent 2,765,236 issued on October 2, 1956. The method described in this patent requires 16 to 24 hours to achieve a residual moisture content of not greater than 2 percent. In other methods reported in the literature, drying times as low as about 8 hours are reported. The long drying times of the processes of the prior art have made the process a costly one, and consequently, relatively small quantities of food are presently processed in this fashion. Thus, the development of freeze-drying as a standard commercial processing operation has been held up by the uneconomical methods presently available. Substantial reduction in the processing time, and consequently cost, for freeze-drying would result in immediate, widespread use of the process by food processors.

Thus, there is a need in the art for a process that will substantially reduce the time required for freeze-drying, while preserving appearance and taste in the reconstituted food.

The primary limits in any process for freeze-drying are imposed by (1) the phase diagram of water, which defines the pressure-temperature region for sublimation, and (2) the heat and mass transfer characteristics of the material to be dried. The presently accepted phase diagram for water indicates that ice will sublime at all temperatures when the vapor pressure is not greater than about 4 millimeters of mercury. By present methods, heat transfer to the food to be dried limits the drying rate. The drying time reported for the methods and equipment of the prior art represent limitations of the method and equipment employed. Removal of vapor from the surface of the food being dried is diffusion-controlled and, at the low pressures, requires large vapor paths in the equipment. Present systems neither allow rapid transfer of heat to all surfaces of the material being dried, nor do they permit rapid removal of water vapor from all surfaces. In copending United States patent application Serial No. 817,091, filed June 1, 1959, and issued May 22, 1962, as U.S. Patent No. 3,035,918, the method of treating food in a fluidized bed of solid, discrete particles is described. By immersing the food to be dried in a fluidized bed of solid, discrete particles, rapid transfer of heat to all surfaces of the food being dried is accomplished, as well as the rapid removal of water vapor from all surfaces.

It is an object of this invention to provide a new method of freeze-drying, wherein a frozen food is immersed in a fluidized bed of solid, discrete particles at a vapor pressure not greater than 4 millimeters of mercury.

It is a further object of this invention to substantially reduce the time for the freeze-drying process by immersing the food to be dried in a fluidized bed of solid, discrete particles at a vapor pressure not greater than 4 millimeters of mercury, and applying heat to the food being dried.

It is another object of this invention to provide a freeze-dried product with optimum storage stability by freeze-drying in a fluidized bed of solid, discrete particles, wherein fluidization of the bed is accomplished by an inert gas.

The above objects are achieved by the present invention by immersing a frozen food in a fluidized bed of solid, discrete particles while maintaining either an absolute pressure in the fluidized bed chamber of not more than about 4 millimeters of mercury, or an atmosphere of dry gas such that the vapor pressure does not exceed about 4 millimeters. A temperature greater than −15° C. is maintained in the fluidized bed chamber. The food is removed from the fluidized bed when the desired residual moisture content is reached.

Figure 2:
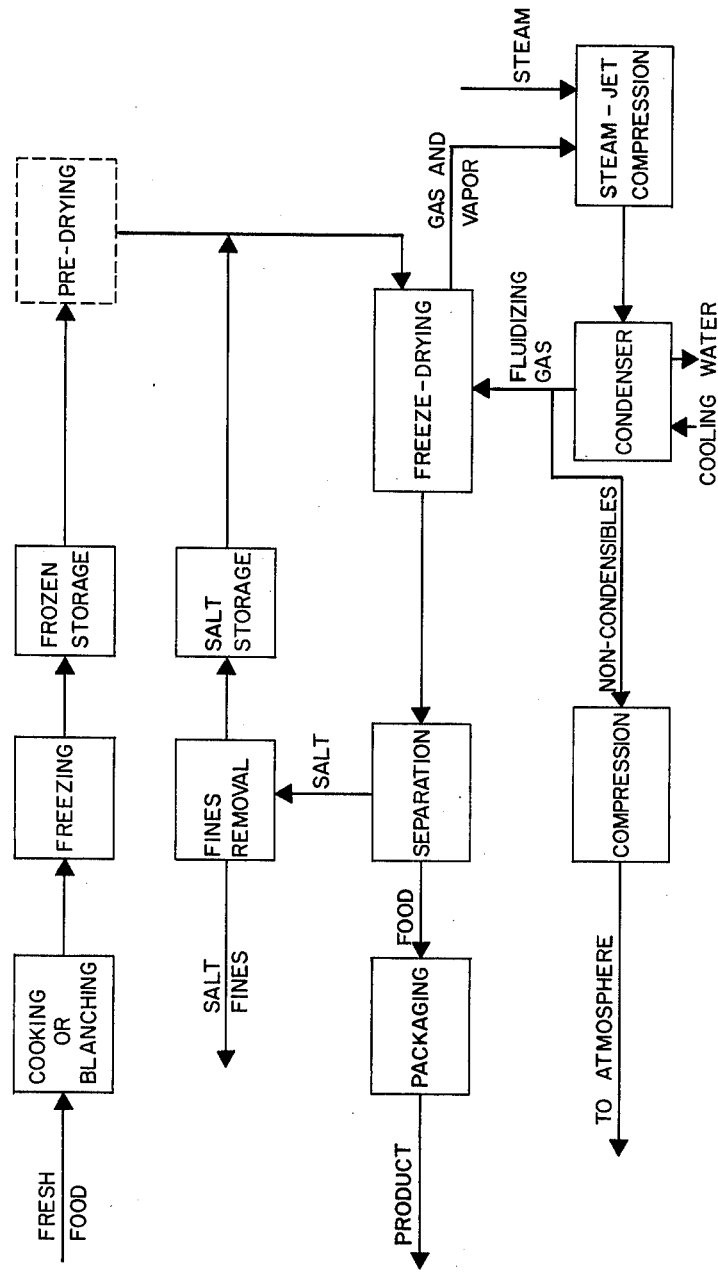

FIG. 1 is a drawing of apparatus in which the process is practiced. FIG. 2 is a block diagrammatic showing of the process. During further discussion of the process, reference will be made to the drawings.

In this process, a bed of solid, discrete particles 11 is subjected to an upward gaseous current 12, the size and weight of the particles and the velocity and nature of the current being so chosen that the force exerted by the current is sufficient to counterbalance the gravitational force on free particles and to expand the bed, thus allowing movement of the particles, but being insufficient to convert the bed into a stream of particles. A bed of solid, discrete particles subjected to, and expanded by, such an upward gaseous current in the manner described is herein referred to as a "fluidized bed." A perforated plate 13 supports the bed material and assists in distributing the fluidizing gas 12 over the total base area of the unit. While a fluidized bed, per se, is well known and used in many areas of technology, the treatment of food in a fluidized bed by immersing the food therein is first disclosed in copending application, Serial No. 817,091, filed June 1, 1959, now U.S. Patent No. 3,035,918. When applied to freeze-drying, surprising results are obtained.

Since a food product is involved, that portion of the system 14 coming in contact with the food must be constructed of a material suitable for food preparation. Health authorities can readily provide a list of approved materials of construction. The particle to be fluidized is selected because of its ability to be fluidized, its stability at the temperature at which the bed is to be operated, and its safeness from a health standpoint. The fluidized bed particles 11 may comprise a material suitable for flavoring or seasoning of the food being treated. There are many materials that meet these requirements for purposes of this process. Among the materials that are suitable as fluidized bed particles are sodium chloride, calcium chloride, tricalcium phosphate, limestone, monosodium glutamate, sugar, rice, beans, lentils, or any material that is a solid of appropriate particle size at the temperature of operation and is generally regarded as safe as a food additive or is, in fact, an edible food. In fact, the bed particles may even comprise dried particles of the same food being dried. However, it is necessary that the bed particles be edible so long as they do not contaminate the food being treated, or are separable therefrom. Appropriately sized beads of any material that may contact food, such as stainless steel, glass, copper, cast iron, to name a few, may also be suitable bed materials. Any such beads that might adhere to the food can be readily separated. Since sodium chloride is stable over most operating temperatures encountered, is available in various particle sizes, is generally added to most foods before eating, and is a readily available commodity at extremely low price, it is the most desirable of the potential bed materials in practicing the process. Bed particles do not adhere to the surface of food being treated when said surface is maintained in a frozen condition until substantially dried.

The gas 12 used to fluidize the particles in the bed must not render the food to be treated inedible. Many gases are suitable for this purpose. Included among these are air, nitrogen, carbon dioxide, and flue gas. Where it is desired to inhibit oxidation of the food being treated, a nonoxidizing gas should be used. Nitrogen and carbon dioxide are most suitable in this instance. To minimize processing costs, the fluidizing gas may be circulated in a closed system and may be recycled through the bed. Since it is not desired to add water to the product being treated, the fluidizing gas should be maintained in a reasonably dry condition. This is readily accomplished by passing this gas through a suitable drying agent, or following an appropriate drying procedure before it is recirculated through the bed of particles.

The food 15 to be freeze-dried by this process is first frozen. Any conventional technique for freezing of a food can be employed. In addition, the food may be frozen by the method disclosed in copending patent application Serial No. 817,091, namely, by immersing the food in a fluidized bed of solid, discrete particles maintained at a temperature below 0° C. Any food which contains water in the form of ice may be freeze-dried by this process. Fruits, vegetables, meats, and fish, etc., may be freeze-dried in a fluidized bed of solid, discrete particles. Even many foods that are normally liquids may be frozen and then freeze-dried. The more common of these are fruit and vegetable juices, coffee extract, and milk. The food to be freeze-dried may be of any size. The method works best, however, when the food to be freeze-dried has at least one dimension not greater than two inches. Liquids can be frozen by known techniques in appropriate size, or can even be reduced in size. Where the natural size of the food being treated is greater than this, the time required for freeze-drying is reduced by reducing the size of the food being processed so that at least one dimension is two inches or less. Many vegetables, such as peas, corn, green beans, lima beans, to name a few, and most fruits, such as cherries, berries of all kinds, etc. need no size alteration. Larger fruits and vegetables can be cut to appropriate size before freeze-drying where desired to cut the time required for the process. In the case of meats and fish, appropriate cuts are freeze-dried.

The frozen food 15 is immersed in a fluidized bed of solid, discrete particles 11. The food should be completely immersed in the bed of particles. The frozen food may be fed either continuously or in batch fashion into the fluidized bed. This can be accomplished through a port 16, which in a batch operation need not be equipped with a vacuum lock arrangement. In a batch-type operation, the frozen food may be immersed in the fluidized bed at atmospheric pressure. After the frozen food is in the fluidized bed, the pressure is reduced to the desired level. Where the fluidized bed chamber is maintained at a reduced pressure, the frozen food to be freeze-dried is fed into the fluidized bed chamber by means of vacuum locks. In this situation, the feed may be continuous or batch, as desired.

The phase diagram of water defines a pressure-temperature region where sublimation will occur, i.e., ice will change directly to vapor without passing through the liquid phase. The sublimation of ice is the foundation for the entire freeze-drying concept. The phase diagram of water shows that, at a vapor pressure of not greater than about 4 millimeters of mercury, ice will sublime to vapor. Thus, during the drying step of the process, the vapor pressure in the fluidized bed chamber cannot be greater than about 4 millimeters of mercury. A vapor pressure not greater than about 4 millimeters can be maintained by keeping the absolute pressure in the fluidized bed at not greater than about 4 millimeters of mercury, or by using a dry gas for fluidizing the bed of particles. The pressure can readily be reduced by means such as a tube 17 connected to a vacuum pump or other vacuum source. The only pressure limitation imposed on this process is that imposed by the phase diagram of water. The drying steps of this process are carried out at a pressure and temperature at which solid ice will sublime. However, practical considerations, such as the size and cost of vacuum equipment, dictate that the absolute pressure in the fluidized bed chamber not be reduced below about from 1 to 10 microns of mercury. While the process can be carried out at atmospheric pressure, lower temperatures and a dry fluidizing gas are necessary to achieve a vapor pressure less than about 4 millimeters, and consequently longer drying times usually result. For example, temperatures in the ranges of −15° to +5° C. are most effective in drying under these conditions. In practicing this process, conventional vacuum techniques and equipment are used to achieve the desired system pressure.

It has been observed that operating at a reduced pressure does not interfere with the fluidization of the bed particles and that fluidization of the bed particles does not prevent operating the system at a reduced pressure sufficient for freeze-drying. Of course, the depth of the fluidized bed must not be so great that the pressure drop from the top to the bottom of the bed results in a pressure at the bottom of the bed that exceeds about 4 millimeters of mercury. The critical bed depth for any given bed particle can readily be determined by means of a pressure-temperature probe 18 that can measure the pressure or temperature at any given bed depth. This result was not predictable from the known state of the art.

While the frozen food 15 is immersed in the fluidized bed of solid, discrete particles 11, with vapor pressure in the fluidized bed chamber 14 of not more than about 4 millimeters of mercury, the heat of sublimation is supplied to the food to remove the ice as water vapor. The particles in the fluidized bed are heated by any known means. For example, these particles may be heated by the fluidizing gas, through the vessel walls, by coils immersed in the bed and carrying steam or hot fluids, or by heating the particles themselves through radiated heat, dielectric heating, or induction heating. The food 15 to be dried is contacted on all sides by the bed particles 11. It is this intimate contact of a solid with a solid that produces heat-transfer rates that are vastly superior to those obtained by any other known method of freeze-drying. Even when the only heat supplied is from the fluidizing gas at normal room temperature, about 20° C., drying times superior to those obtainable by present processes are achieved. When additional heat is provided by elevating the temperature of the fluidized bed particles, drying times are reduced still further, without affecting taste or appearance of the food. For example, at a bed temperature of about 40° C., ⅜-inch cubes of chicken can be dried to a residual moisture content of less than 2 percent in less than 2 hours. Times reported for processes of the prior art range from 7 hours up to 14 hours for the same material. Extremely short drying times are obtained by the process described herein, because the particle is heated quickly and continuously through all surfaces by contact with the particles of the fluidized bed at temperatures below those at which scorching or denaturing of the product are likely to occur. In addition, vapor liberated during the heating is continuously removed from the solid-gas interface. In supplying the heat of sublimation to the ice in the frozen food, the rate of heat application in this process is limited only by the temperature at which scorching or denaturing of the food occurs. At a temperature greater than 15° C., drying times of suitable length are obtained. When the temperature of the fluidized bed chamber is about 40° C., considerably shorter drying times are achieved. While the temperature at which scorching will occur varies from food to food, those skilled in the art can readily determine this temperature for each food item by a preliminary test. When heat is applied at a temperature safely below, but near, the scorching or denaturing temperature for the food item being dried, the shortest possible drying times are obtained.

When the residual moisture content of the foods being dried reaches the desired level, the food is removed from the fluidized bed chamber. While residual moisture contents not greater than about 7 percent are acceptable, the food is storable for a longer period of time without deterioration when the residual moisture content is not greater than about 2 percent. The dried food may be removed from the fluidized bed chamber either continuously or in a batch type arrangement. In a batch-type arrangement, the system is brought to atmospheric pressure and the food removed. On a continuous basis, the food is removed through a system of vacuum locks 19, so that the fluidized bed chamber is maintained at a reduced pressure. One method of continuous removal of dried products is by means of a remotely operated scoop 20 that picks up the dried food from the fluidized bed and deposits it in the exit port 21. The scoop 20 would be made of a material sufficiently coarse to permit drainage of the bed particles 11, but fine enough to retain the food 15 that has been dried.

Where oxidation of the food would reduce its quality or shelf life, the chamber 22 from which the food is removed after drying is brought to atmospheric pressure by means of a non-oxidizing gas. Gases such as nitrogen and carbon dioxide are especially suitable for this purpose. The dried food and the container in which it is to be packaged are flushed with an inert gas and the food is sealed in the package. It is also undesirable to have substantial quantities of moisture contact the food prior to the time that it is to be reconstituted. Thus, the gas used to bring the removal chamber to atmospheric pressure and to flush the food and container before packaging is maintained in a substantially dry condition. There are standard methods for the removal of moisture from gases and any of these may be applied here for this purpose.

Food freeze-dried by this process can be packaged for storage in containers that are presently employed for freeze-dried foods by other processes. It is important that the container act as a moisture barrier to prevent pick-up of moisture by the food. Where oxidation of the food would have a deleterious effect on its storage, the container should also be a barrier to oxygen. Most metal cans and glass jars meet these requirements, as well as some metal foil and plastic containers.

To prepare the food for consumption, it is only necessary to open the container and to replace the water that had been removed from the food. Standard methods of reconstitution for freeze-dried foods are applicable to foods prepared by this process. For example, immersing the food in water for approximately 15 to 20 minutes will restore it to, or near, its original moisture content. Where special effects are desired, liquids other than water may be used to reconstitute the food. For example, meats may be reconstituted using wines of various flavors and types. Milk may be used for other foods. Other liquids and seasonings used in cooking and food flavoring can be added to the food in various amounts in much the same manner.

The above discussion has been directed to providing general details on the practice of this process. The following examples are intended to specifically illustrate the process of this invention. The specificity of these examples is for illustrative purposes only and is not intended as a limitation upon the scope of the invention.

*Example I*

Sodium chloride particles were fluidized by dried nitrogen gas. Chicken was segmented to a size having at least one dimension of the order of ¼-inch to ½-inch. These chicken pieces were frozen by conventional means. The frozen segments of chicken were then immersed in the fluidized bed of sodium chloride particles. The system was closed and the absolute pressure in the fluidized bed chamber was reduced to approximately 2 millimeters of mercury. Under these conditions, the chicken pieces were reduced to a residual moisture content of not greater than 4 percent in approximately 6 hours. In this run, the fluidized bed chamber was maintained at approximately 20° C.

*Example II*

The conditions of Example I were repeated with the one exception that heat was supplied to the sodium chloride particles in the fluidized bed. Sufficient heat was supplied to maintain the fluidized bed chamber at approximately 40° C. Under these conditions, the corresponding residual moisture content of the chicken segments was reached in less than 2 hours.

*Example III*

Frozen cubes of halibut, approximately ½-inch on a side, were immersed in a fluidized bed of sodium chloride particles. The sodium chloride particles were fluidized with nitrogen gas. The absolute pressure of the fluidized bed chamber was approximately 2 millimeters of mercury during drying. Heat was supplied to the fluidized bed chamber until the residual moisture content of the halibut was less than 4 percent. Care was taken that scorching of the halibut did not occur. After the desired residual moisture content was reached, the fluidized bed chamber was brought to atmospheric pressure with nitrogen gas and the halibut placed in a glass container that had previously been flushed with nitrogen gas. A sealing lid was then placed on the container.

*Example IV*

Frozen cooked shrimp were immersed in a fluidized bed of sodium chloride particles. The particles were fluidized with nitrogen gas. The absolute pressure in the fluidized bed chamber was maintained at about 1 millimeter of mercury. Heat was then applied, raising the temperature in the fluidized bed chamber to about 40° C. After about 2 hours, the shrimp were removed from the fluidized bed chamber through a series of vacuum locks, the final lock being at atmospheric pressure and containing an atmosphere of nitrogen gas. The shrimp were then packaged in a glass container which had been flushed with nitrogen gas and a vapor-tight lid placed thereon.

These shrimp had a residual moisture content of less than 2 percent.

Several days later, these same dried shrimp were removed from the container and reconstituted by immersion in water for approximately 15–20 minutes. After reconstitution, these shrimp closely resembled undried, cooked shrimp in texture, taste, and appearance.

Example V

Frozen kernel corn was immersed in a fluidized bed of sodium chloride particles. The sodium chloride particles were fluidized with nitrogen gas. The absolute pressure in the fluidized bed chamber was maintained at about 1 millimeter of mercury. Heat was supplied to the fluidized bed chamber, and the temperature was raised to about 40° C. The corn was removed from the fluidized bed chamber when sampling indicated that the residual moisture content was less than 2 percent.

Example VI

Following the procedure of Example V, peas were dried to a residual moisture content of less than 2 percent. Approximately 90 minutes were required to reach this state.

Example VII

Following the procedure of Example V, carrots and asparagus were dried to a residual moisture content of less than 2 percent.

Example VIII

Frozen fruits, such as berries of all kinds, cherries, peaches, and plums, could be freeze-dried in a fluidized bed of sugar. The fluidized bed chamber could be maintained at a temperature of 40° C. without decomposition of the sugar occurring. Under these conditions, rapid drying would occur, and most fruits could be dried to a residual moisture content not greater than 2 percent in approximately 2 hours or less.

Example IX

Sliced, frozen strawberries were immersed in a fluidized bed of sugar particles. The sugar particles were fluidized with nitrogen gas. The absolute pressure in the fluidized bed chamber was reduced to about 1 millimeter of mercury. Heat was applied to the fluidized bed chamber by radiation and the temperature was raised to about 40° C. In approximately 2 hours, the residual moisture content of the strawberries was less than 2 percent. The fluidized bed chamber was then brought to atmospheric pressure with nitrogen gas and the dried strawberries removed.

Example X

Frozen carrots, cut into particles having dimensions of about ⅛ inch or less were immersed in a fluidized bed of dry carrot particles of about the same size. The dry carrot particles had previously been freeze-dried. Nitrogen gas was used to fluidize the carrot particles. The absolute pressure in the fluidized bed chamber was reduced to about 1 millimeter of mercury. The temperature of the fluidized bed chamber was raised to about 40° C. After about 1 hour, the fluidized bed chamber was brought to atmospheric pressure with nitrogen gas and a portion of the carrot particles was removed. The dried product had a residual moisture content of less than 2 percent.

In a continuous operation, a new charge of frozen, undried carrot particles would be fed into the bed of dried carrot particles retained, and the process repeated.

Example XI

Frozen cubes of beef, about ½ to 1 inch on a side, can be freeze-dried to a residual moisture content of not greater than 2 percent, in a fluidized bed of sodium chloride particles in approximately 3 hours or less. This product can be reconstituted by immersion in water for from 15–2 minutes. For special dishes, this same meat can be partially or wholly reconstituted by immersion in cooking wine. Meats presently cooked or marinated in wine are considered specialty items of better restaurants.

Example XII

If frozen bits of chicken are immersed in a fluidized bed of sodium chloride particles, the chicken can be dried to a residual moisture content of about 7 percent in less than 20 hours when the fluidized bed chamber is maintained at atmospheric pressure, a temperature of about −2° C., and dry nitrogen gas is used to fluidize the sodium chloride particles.

It can be seen from the above examples that the process of this invention is one of broad application and can be used to freeze-dry many foods. All foods susceptible to freeze-drying are intended to be included within the scope of the appended claims.

What is claimed is:

1. A method of removing water from a frozen food comprising the steps of:
   (a) fluidizing a bed of solid, discrete particles;
   (b) immersing a frozen food in the fluidized bed of solid, discrete particles while maintaining in the fluidized bed a vapor pressure of not more than about 4 millimeters of mercury and a temperature greater than −15° C. and less than will scorch the food; and
   (c) removing the food from the fluidized bed when the residual moisture content of said food is not greater than about 7 percent.

2. A method of removing water from a frozen food comprising the steps of:
   (a) fluidizing a bed of solid, discrete particles with an inert gas;
   (b) immersing a frozen food in the fluidized bed of solid, discrete particles;
   (c) maintaining in the fluidized bed a temperature greater than +15° C. and less than will scorch the food and a vapor pressure of not greater than about 4 millimeters of mercury; and
   (d) removing the food from the fluidized bed when the residual moisture content of said food is not greater than about 7 percent.

3. A method of removing water from a frozen food comprising the steps of:
   (a) immersing a frozen food in a fluidized bed of inert, solid, discrete particles, said particles being fluidized by an inert gas;
   (b) raising the temperature of the fluidized bed above ambient temperature and below the temperature at which scorching of the food will occur;
   (c) continuing the application of heat to the food until the residual moisture content of said food is not greater than about 7 percent;
   (d) maintaining in the fluidized bed a vapor pressure of between about 0.001 and about 4 millimeters of mercury during steps (a), (b), and (c); and
   (e) removing the food from the fluidized bed.

4. The method of claim 3 wherein the particles that are fluidized comprise an edible material.

5. The method of claim 3 wherein the particles that are fluidized comprise a material that is generally considered to be nontoxic for purposes of contacting food.

6. The method of claim 3 wherein the inert gas is a gas selected from the group consisting of nitrogen and carbon dioxide.

7. A method of removing water from a frozen food comprising the steps of:
   (a) fluidizing a bed of solid, discrete, edible particles with nitrogen gas;
   (b) immersing a frozen food in the fluidized bed of solid, discrete edible particles;
   (c) raising the temperature of the fluidized bed of solid, discrete, edible particles to a temperature below the decomposition temperature of said particles;
   (d) continuing the application of heat to the food until the residual moisture content of said food is not greater than 2 percent;

(e) maintaining a vapor pressure in the fluidized bed chamber of between about 0.01 and about 4 millimeters of mercury during steps (b), (c), and (d);

(f) transferring the dried food from the fluidized bed chamber to an exit chamber brought to atmospheric pressure by means of nitrogen gas; and (g) removing the food from the exit chamber under substantially oxygen-free and moisture-free conditions.

8. The method of claim 7 wherein the frozen food immersed in the fluidized bed has at least one dimension not greater than 2 inches.

9. The method of claim 7 wherein the fluidized bed of solid, discrete, edible particles is raised to a temperature not greater than about 100° C.

10. A method of drying a frozen food comprising the steps of:

(a) fluidizing with an inert gas a bed of dried, solid, discrete food particles;

(b) immersing in the fluidized bed, frozen particles of the same food as comprises the bed;

(c) raising the temperature of the fluidized bed to about 40° C.;

(d) continuing the application of heat to the food until the residual moisture content of said food is not greater than 2 percent;

(e) maintaining a vapor pressure in the fluidized bed chamber of between about 0.01 and about 4 millimeters of mercury during steps (b), (c), and (d); and (f) removing a portion of the dried food from the fluidized bed chamber, while maintaining an inert atmosphere.

References Cited by the Examiner

UNITED STATES PATENTS

| | | | |
|---|---|---|---|
| 2,273,350 | 2/1942 | Fry | 34—15 |
| 2,480,146 | 8/1949 | Lee | 34—5 X |
| 2,561,392 | 7/1951 | Marshall | 99—199 |
| 2,830,911 | 4/1958 | Fogelberg | 34—37 |
| 3,010,216 | 11/1961 | Ravet | 34—92 |
| 3,035,918 | 5/1962 | Sorgenti | 99—195 |

FOREIGN PATENTS 506,828  10/1954  Canada.

WILLIAM F. O'DEA, *Primary Examiner.*

NORMAN YUDKOFF, *Examiner.*